Patented Jan. 5, 1937

2,067,100

UNITED STATES PATENT OFFICE 2,067,100

ORGANIC MERCURY SILICATE AND PROCESS OF PREPARING SAME

Fritz Schönhöfer, Wuppertal-Elberfeld, and Wilhelm Bonrath, Leverkusen-I. G. Werk, Germany, assignors to Winthrop Chemical Company, Inc., New York, N. Y., a corporation of New York No Drawing. Application January 16, 1935, Serial No. 2,118. In Germany January 20, 1934

10 Claims. (Cl. 260—13)

This invention relates to new organic mercury-silicates and to a process of preparing the same.

The present invention is based on the discovery that new organic mercury silicates in which one valency of the mercury is bound to a silicate group and the other valency is attached to an organic radical are highly efficacious against plant pests and micro organisms, such as bacteria, moulds and the like, so that they can be employed for all purposes of preserving or disinfecting, especially for immunizing of seed grain, the preservation of wood, the prevention of mildew formation, the preservation of glue and the like.

In accordance with the present invention the new organic mercury compounds in which one valency of the mercury is bound to a silicate group and the other valency is attached to an organic radical are prepared by reacting a reactive silicon compound, such as silicic acid, its salts, double salts and derivatives thereof, for instance, halogen compounds, upon mercurized saturated or unsaturated aliphatic, aromatic, hydroaromatic, heterocyclic and alicyclic hydrocarbons. The hydrocarbon radical may be substituted by hydroxyl, carboxylic, carboxylic ester, acyl, amino, alkylamino and acylamino, sulfo, nitro, halogen or cyanic groups. Also alkoxy groups, the oxygen atom of which is separated from the mercury atom by more than two carbon atoms may be present. If desired, free silicic acid by decomposition of, for instance, carbonic acid or acetic acid can be produced in the reaction mixture, or silicic acid can be used as sol or gel. Normally the process is effected in the presence of a solvent or diluent.

For the purpose of disinfecting or immunizing grain the above compounds may be added to appropriate filling or absorption agents, such as talc, bolus, kaolin, kieselguhr, or to other substances exerting a fungicidal effect. Tests have shown that the above mentioned compounds, for example, prevent the germination of stone blight spores at a concentration much below that which would endanger the seed grain.

The above products very often have a non-uniform chemical composition, since the initial silicious materials usually consist of mixtures; the usual water glass or sodium silicate, for instance, consisting in most cases of di-, tri- and tetrasilicates.

According to the specific material to be disinfected the organic mercury compounds are applied in the most variable manner. The quantities to be added of the disinfectants may vary within wide ranges; on carrying out the process of disinfecting or immunizing seed grain everyone skilled in the art will be in a position to determine without difficulty the concentration most suitable for any specific purpose in view.

The invention is further illustrated by the following examples without being restricted thereto:

Example 1.—26.45 parts by weight of ethyl-mercury chloride are treated with 17 parts by weight of silver nitrate in alcoholic solution. The mixture is filtered with suction from the separated silver chloride and the alcohol is driven off. The remaining ethyl mercury nitrate is dissolved in 200 parts by weight of water and mixed with a solution of 40 parts by weight of technical sodium water glass in 50 parts by weight of water. The precipitate separating is filtered with suction and dried. The silicon-containing mercury compound obtained is almost colorless, almost insoluble in water and alcohol and does not melt on heating up to 250° C. No decomposition takes place on treating the mixture with concentrated hydrochloric acid when cold or on short heating. However, on boiling several hours with concentrated hydrochloric acid or for a short time with aqua regia a solution is obtained after diluting with water and filtering which separates yellow mercury oxide on the addition of caustic soda solution, and which yields a precipitate of mercury sulfide on the addition of ammonia and ammonium sulfide.

Instead of ethylmercury chloride also methyl-, propyl-, and isopropyl-mercury chlorides or bromides may be employed as starting materials.

Example 2.—15.9 parts by weight of hydroxy-propyl-mercury acetate are dissolved in 40 parts by weight of water and treated with a solution of 20 parts by weight of water glass in 20 parts by weight of water. A white magma separates which is filtered with suction, washed and dried.

The product in its chemical and physical behaviour resembles the products described in the foregoing example.

Instead of hydroxypropyl-mercury acetate other hydroxy substituted mercurized aliphatic hydrocarbons, such as for instance hydroxyethyl-, hydroxyisopropyl- and acetoxyethyl-mercury salts, such as acetates, chlorides or bromides may be employed.

Also mercurized aliphatic hydrocarbons substituted by carboxylic and carboxylic ester groups such as for instance bromomercury-acetic acid, chloromercuryethyl acetic ester of the formula

and formic acid methylester mercury acetate of the formula

may serve as starting materials.

Further, acyl derivatives of aliphatic hydrocarbons, such as benzoyloxymethyl-mercury chloride and the above indicated acetoxyethyl-mercury chloride as well as halogen and cyanic derivatives of mercurized aliphatic hydrocarbons, such as compounds of the formula

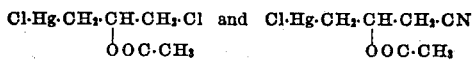

may be used as starting materials.

The reactive silicon compounds may also be reacted upon unsaturated mercurized hydrocarbons, such as for instance the compound of the formula

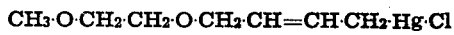

*Example 3.*—32.85 parts by weight of ortho-hydroxy-phenyl-mercury chloride are dissolved in 4000 parts by weight of water while heating, and a solution of 40 parts by weight of water glass in 100 parts by weight of water is added to the mixture.

The precipitate is filtered with suction, washed with water and dried. Thus an almost colorless product is obtained which is almost insoluble in water and alcohol but soluble in dilute caustic soda solution. On heating to 250° C. no melting takes place. On adding hydrochloric acid to an alkaline solution of the compound a precipitate is formed. The separated clear filtrate separates yellow mercury oxide on the addition of caustic soda solution.

Instead of ortho-hydroxyphenyl-mercury chloride cresol- and xylenol-mercury salts may be employed as starting materials.

Also mercurized aromatic hydrocarbons substituted by carboxylic and carboxylic ester groups, such as for instance chloromercury salicylic acid and the mercurization product of salicylic acid phenylester may be employed.

*Example 4.*—25 parts by weight of dimethyl-aniline-mercury acetate are dissolved in 4000 parts by weight of water and treated with 25 parts by weight of water glass. After 24 hours the precipitate formed is filtered with suction, washed and dried. Thus an almost white powder is obtained which is insoluble in water and alcohol. It does not melt when heated up to 250° C.

When treating the product with the five-fold quantity of concentrated hydrochloric acid while heating and adding water and filtering, the clear solution obtained yields a precipitate of mercury oxide on the addition of caustic soda solution.

Instead of dimethylaniline-mercury acetate monomethylaniline- and aniline mercury salts may be used.

Similar products as those described in this example are obtained when using benzophenon-mercury chloride, 1-chloromercury-naphthol-2-sulfonic acid or mercurized aromatic nitro compounds, such as for instance mercurized nitrophenols, dinitrophenols, nitrotoluenes and the like.

Likewise mercurized halogen derivatives of aromatic hydrocarbons, such as for instance chlorophenyl-, chlorophenol- and chlorotoluene mercury salts may be used as starting materials.

Further, mercurized hydroaromatic compounds, such as 1-methoxy-cyclohexane-2-mercury chloride, 1-methoxy-3-cyanocyclohexane-6-mercury chloride, 1-methoxy-cyclopentane-2-mercury chloride as well as heterocyclic compounds, such as pyridine-3-mercury-iodide, diphenyleneoxide-1-mercury acetate and 2-pyridone-5-mercury chloride may be employed.

Also mercurized aromatically substituted aliphatic compounds, such as for instance acetophenon-omega-mercury chloride and 1-methoxy-benzene-4-(alpha - acetoxyethyl - beta - mercury chloride) may serve as starting materials.

*Example 5.*—34.6 parts by weight of acetyloxyethyl-mercury acetate dissolved in the six-fold quantity of water are mixed with a solution of 45 parts by weight of water glass in the same quantity of water. The reaction product forms a thick magma. The mixture is filtered with suction, washed and dried. The mercury-silicon compound formed is a yellowish white powder which is insoluble in water and most organic solvents. On heating the product displays a distinct yellow coloration which becomes pale at higher temperatures; no melting occurs up to 250° C. On treating the substance with hydrochloric acid while heating solution with the separation of silicic acid takes place. This hydrochloric acid solution separates yellow mercury oxide on the addition of caustic soda solution.

*Example 6.*—20 parts by weight of phenylmercury acetate are dissolved in 250 parts by weight of alcohol and 750 parts by weight of water and mixed with a solution of 24 parts by weight of water glass in 25 parts by weight of water. A thick white precipitate separates which is filtered with suction after 24 hours, washed with water and dried. Thus an almost white powder is obtained which is almost insoluble in water and alcohol and which dissolves on heating with aqua regia while separating silicic acid. This solution separates yellow mercury oxide on the addition of caustic soda solution.

Phenylmercury-acetate may be replaced by its higher homologues, such as for instance tolyl-mercury acetate.

*Example 7.*—Ethylene is introduced into a mixture of 22 parts by weight of mercury oxide, 200 parts by weight of water and 6.5 parts by weight of acetic acid at ordinary temperature while stirring until the mercury oxide has almost completely dissolved. A solution of 40 parts by weight of water glass in 200 parts by weight of water is added to the mixture while stirring. Very soon a white magma separates which is washed with water and dried. The product thus obtained is a white powder which is practically insoluble in water and the customary organic solvents, soluble in caustic soda solution and has properties which are similar to those of the compounds described in Example 1.

*Example 8.*—44 parts by weight of mercury oxide are well suspended in a solution of 400 parts by weight of water and 30 parts by weight of acetic acid. To this suspension a solution of 80 parts by weight of technical sodium water glass in 200 parts by weight of water is added while vigorously stirring. Thus a white magma containing red-brown mercury oxide particles is formed. Ethylene is passed through the suspension in a slow current at room temperature for about 4 hours while stirring until all of the red-brown mercury oxide has disappeared. The solution is filtered with suction and dried.

The new product is an almost white powder which is practically insoluble in water and the customary organic solvents, and soluble to a far reaching extent in caustic soda solution without separating mercury oxide. On treating with sulfuric ammonium solution black mercury sulfide is formed only after some time. On pouring hydrochloric acid over the product especially on subsequent heating it dissolves with the evolution of ethylene. From such solution of the reaction product on the addition of caustic soda solution mercury oxide, on the addition of ammonium sulfide mercury sulfide separate immediately.

Instead of sodium water glass potassium water glass may be employed.

When using instead of the ethylene other organic compounds with reactive ethylene double binding, compounds of similar chemical properties are obtained. Instead of the sodium water glass also other soluble and insoluble silicon compounds may be used.

*Example 9.*—Solutions of 48 parts by weight of mercury acetate in 300 parts by weight of water and 60 parts by weight of technical soda-water glass in 300 parts by weight of water are mixed with 400 parts by weight of ethanol. A solution of 20 parts by weight of phenol in 30 parts by weight of ethanol is added to the yellowish mass formed while stirring. The reaction mixture is kept at about 100° C. for 6 hours while stirring, filtered with suction after the reaction product which has become completely white is cooled, washed with hot alcohol for removing the non-decomposed phenol while stirring, and dried.

The new compound is a white powder which is practically insoluble in water and the customary organic solvents. Its suspension in water is extensively dissolved by means of caustic soda solution without separating mercury oxide. On treating with ammonium sulfide it slowly takes a brown and later on a black color. On heating with hydrochloric acid phenol separates. From the solution of the reaction product in acids on treating with caustic soda solution mercury oxide, and on treating with ammonium sulfide mercury sulfide separate immediately.

Instead of the phenol also substituted phenols, instead of mercury acetate also other mercury salts or mercury oxide may be employed.

We claim:—

1. Organic mercury compounds in which one valency of the mercury is attached to an organic radical and the other mercury valency is linked to the radical of a silicic acid.

2. Organic mercury compounds in which one valency of the mercury is attached to a hydrocarbon radical and the other valency of the mercury is linked to the radical of a silicic acid.

3. Organic mercury compounds in which one valency of the mercury is attached to an aliphatic hydrocarbon radical and the other valency of the mercury is linked to the radical of a silicic acid.

4. Alkyl mercury silicates which are white water-insoluble products.

5. Ethyl mercury silicate, which is a white and water-insoluble product.

6. The process which comprises reacting upon a water-soluble organic mercury salt in which one valency of the mercury is attached to a carbon atom of an organic radical and the other mercury valency is linked to an acid radical, with a silicon compound in the presence of an aqueous diluent.

7. The process which comprises reacting upon a water-soluble organic mercury salt in which one valency of the mercury is attached to a hydrocarbon radical and the other mercury valency is linked to an acid radical, with a water-soluble silicate in the presence of water.

8. The process which comprises reacting upon a water-soluble organic mercury salt in which one valency of the mercury is attached to an aliphatic hydrocarbon radical and the other mercury valency is linked to an acid radical, with a water-soluble silicate in the presence of water.

9. The process which comprises reacting upon a water-soluble organic mercury salt in which one valency of the mercury is attached to an alkyl group and the other mercury valency is linked to an acid radical, with a water-soluble alkali metal silicate, in the presence of water.

10. The process which comprises reacting upon a water-soluble organic mercury salt in which one valency of the mercury is attached to an ethyl group and the other mercury valency is linked to an acid radical, with a water-soluble alkali metal silicate in the presence of water.

FRITZ SCHÖNHÖFER.
WILHELM BONRATH.